June 14, 1927.

W. C. DWYER ET AL 1,632,122

TRACTOR HARROW

Filed Aug. 4, 1922

Inventors.
W. C. Dwyer
and J. I. Mitchell,
By W. P. Doolittle
Atty.

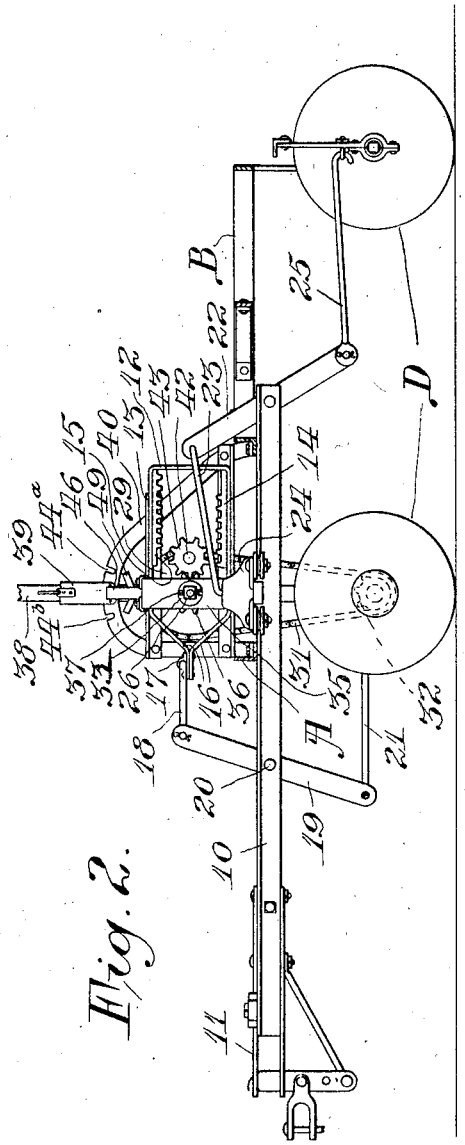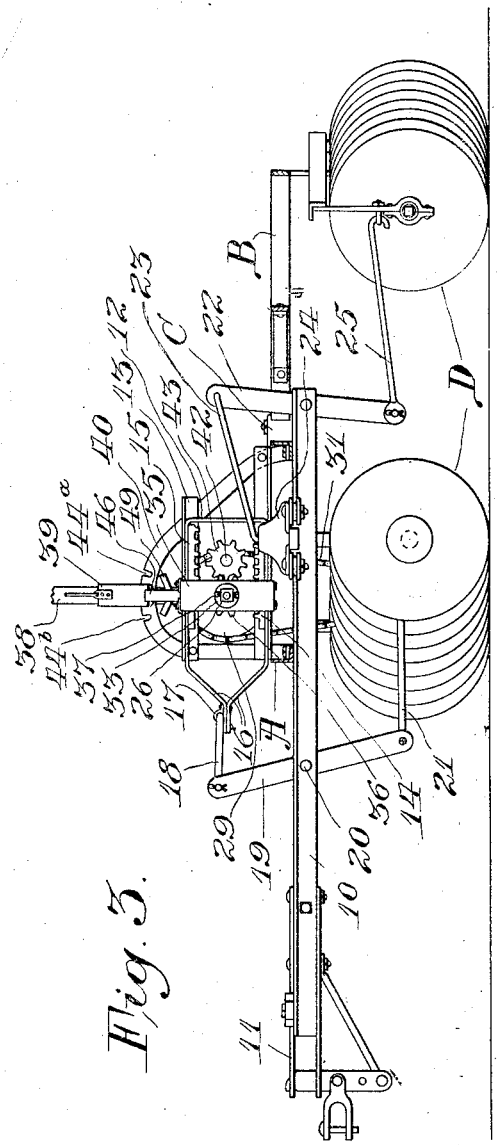

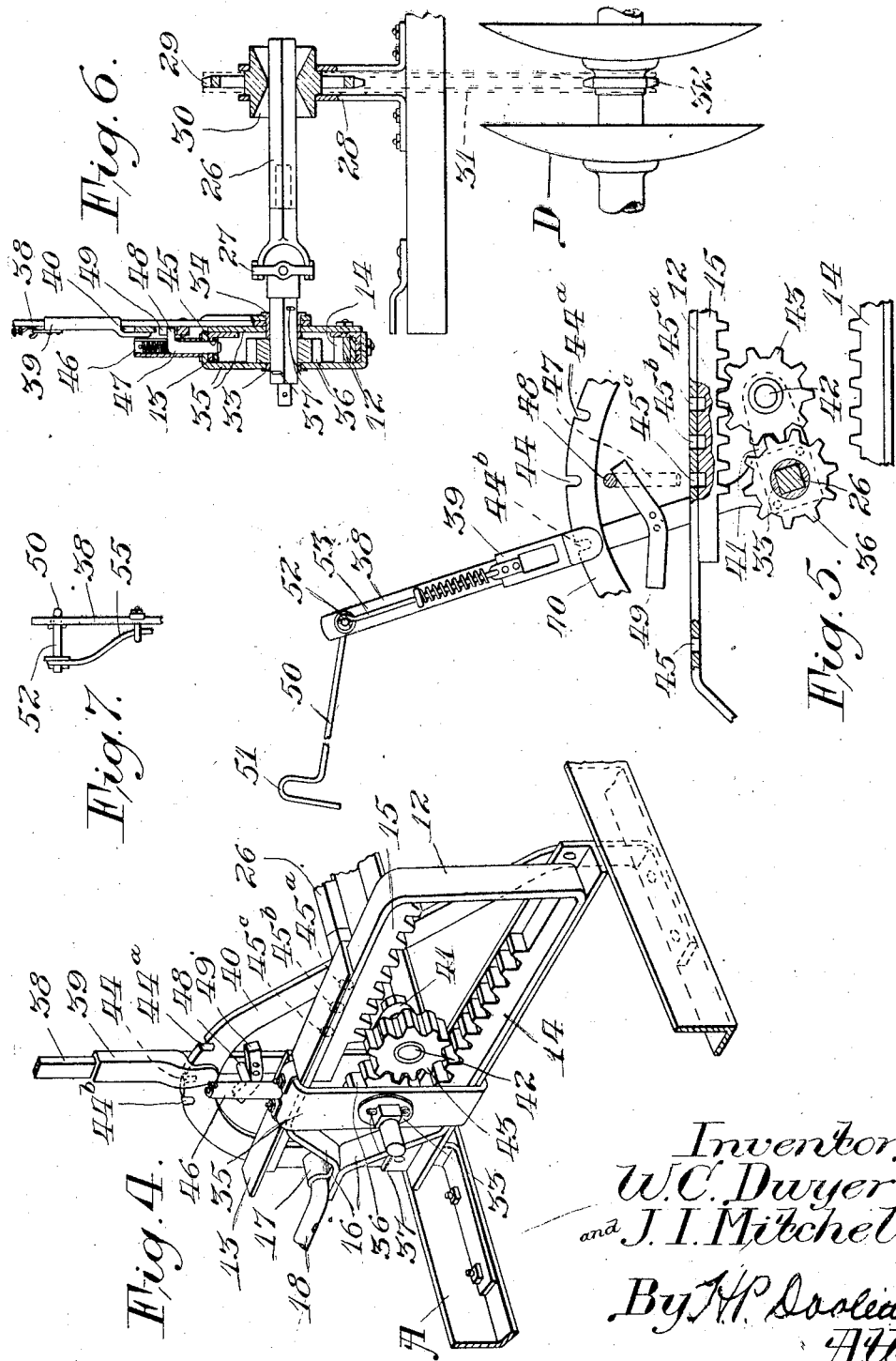

Patented June 14, 1927.

1,632,122

UNITED STATES PATENT OFFICE.

WILLIAM C. DWYER AND JOSEPH I. MITCHELL, OF AUBURN, NEW YORK, ASSIGNORS TO INTERNATIONAL HARVESTER COMPANY, OF CHICAGO, ILLINOIS, A CORPORATION OF NEW JERSEY.

TRACTOR HARROW.

Application filed August 4, 1922. Serial No. 579,577.

This invention relates to tractor disk harrows, and particularly to improvements in the mechanism for controlling the angle of the disk gangs.

The objects of the invention are to substitute angling mechanism driven by travel of the harrow for the hand levers or other devices heretofore used for swinging the disk gangs into and out of working angle and to so construct such mechanism as to make it capable of use as an attachment for existing disk harrows. A further object is to provide simple and convenient control means for the angling mechanism through which the gangs may be set at varying degrees of angle.

These objects are obtained by provision of a moving angling member mounted to slide back and forth on the frame of the harrow and having connections with one end of the disk gangs, which member is preferably composed of a pair of vertically spaced inwardly facing rack bars. A shiftable pinion preferably driven from the axle of one of the gangs is positioned between the rack bars and control mechanism is provided for moving the pinion into and out of mesh with either rack bar and for locking the sliding member to the frame at various points in its length of movement.

The invention accordingly resides in the organization and details of construction or the equivalents thereof hereinafter described and claimed.

Having reference to the drawings:

Fig. 2 is a side view with the gangs in straight or non-working position.

Fig. 3 is a similar view with the gangs in angled position.

Fig. 4 is a detail perspective view of the angle controlling mechanism.

Fig. 5 is a detail view of the lever and pinion forming part of the controlling mechanism.

Fig. 6 is a detail view of the drive for the angling mechanism; and

Fig. 7 is a detail view of the latch mechanism on the lever shown in Fig. 5.

Figure 1:
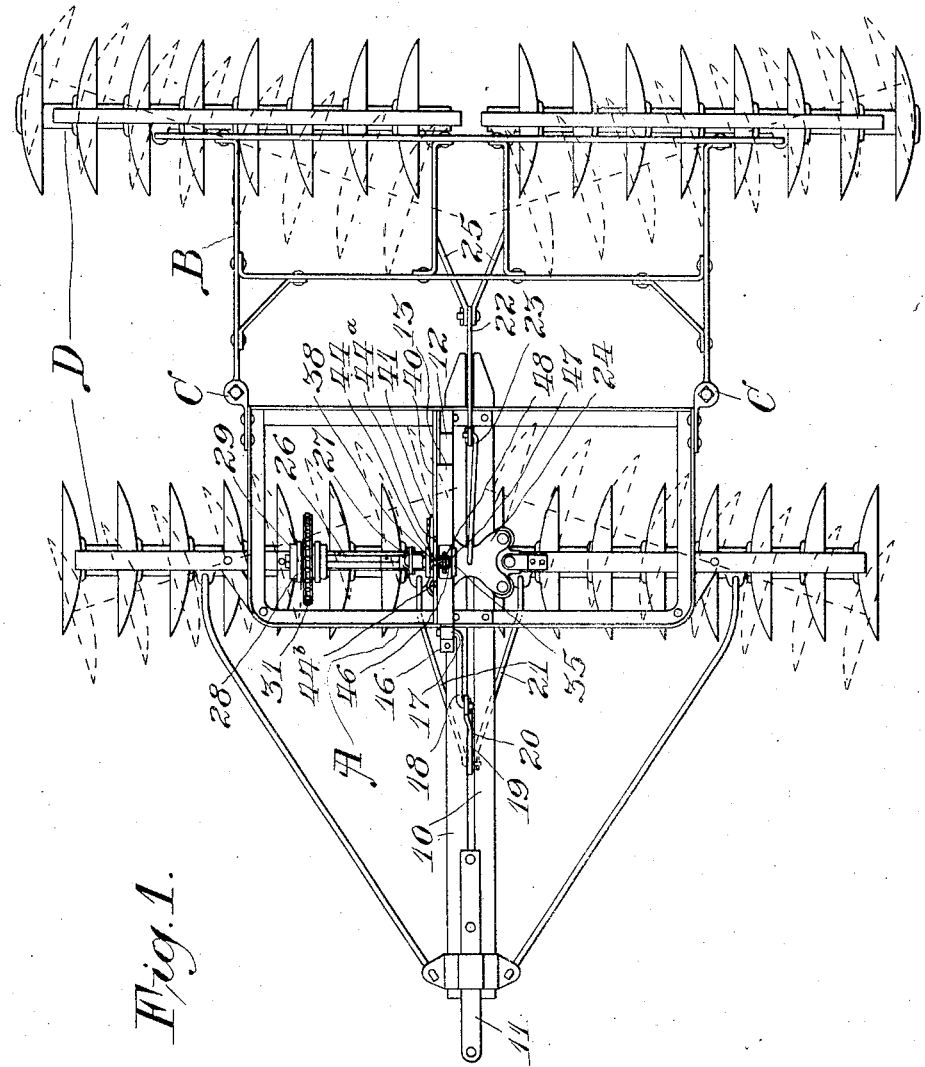
Fig. 1 is a plan view of a tandem tractor disk harrow equipped with the angling mechanism of this invention.

In the present instance the invention is shown as combined with a tractor harrow comprising a front frame A and a rear frame B, which are coupled together at their outer ends and by the coupling brackets C. Each frame has a pair of disk gangs D pivoted thereto in the usual manner and the front frame is provided with a pair of forwardly extending angle iron members 10 constituting a draft tongue, on the forward end of which there is secured the draft clevis 11.

The structure just described forms no part of our present invention and is but one form of disk harrow with which the invention may be used. The mechanism comprising the invention consists of a movable member 12 slidably carried in a frame 13 which is fixedly mounted at or near the middle of the front harrow frame. The member 12 carries a pair of inwardly facing rack bars 14, 15 which are spaced a suitable distance apart and secured to the upper and lower sides of the member 12. The member 12 is preferably formed of a single bar bent into a general rectangular shape connected at the front by converging straps 16, the ends of which are provided with an opening or eye 17 for the reception of one end of link 18, which has its other end connected to an equalizer bar or lever 19 pivoted at its middle as at 20 between the tongue members 10 of the harrow. The lower end of the lever 19 is connected to links 21, which in turn are connected to the inner ends of the front disk gangs. If, as in the present case, the invention is applied to a tandem harrow, the angle of the rear gangs is controlled by a second equalizing lever 22 pivoted at its middle to the rear end of the tongue members 10 and having its upper end connected by link 23 with the saddle piece 24 which connects the inner ends of the front disk gangs and moves with them as they are shifted. The lower end of lever 22 is connected by links 25 with the inner ends of the rear disk gangs and by this arrangement the shifting movement given the front gangs is transmitted in reverse direction to the rear gangs and the two sets of gangs are shifted in unison to and from the working angle as the angling member 12 is moved forwardly and backwardly on the front harrow frame. The mechanism for driving and controlling the sliding member 12 consists of a square countershaft 26 which is formed in two sections connected by universal joint 27. One section is supported in a bearing bracket 28 which is fixed to the upper side of one of the gang frames and in which there is journaled a sprocket wheel 29 which is preferably provided with a hub having a square opening 30 therethrough which is flared on each side as shown in Fig. 6 for the reception of one end of shaft 26. The sprocket wheel 29 is connected by sprocket chain 31 with a drive sprocket 32 fixed to the axle of the disk gang. The other section of shaft 26 is received in bearing spools 33, 34, which are journaled in the vertically extending members 35 forming part of the frame 13. Between the members 35, this section of shaft 26 carries a pinion 36 which rotates with the shaft and is held in position by the inner ends of the bearing spools 33, 34 which are retained on the shaft by any suitable means, such as cotter pins 37. Pivoted on the spool 34, adjacent one of the members 35, there is a lever 38 which is provided with a spring pressed latch 39 cooperating with a sector bar 40 fixed to the harrow frame and projecting above the upper member of the frame 13, as best shown in Fig. 4. The lower end of lever 38 is provided with a crank arm 41 projecting rearwardly at right angles and having a bearing pin 42 on its end projecting between the rack bars 14, 15, on which is journaled a pinion 43 which is in constant mesh with pinion 36 on shaft 25. The sector bar 40 is provided with three equally spaced notches with which the spring latch 39 is adapted to engage and the relation of these notches to the lever 38 is such that when the lever is locked to the central notch 44 the pinion 43 will be in neutral position and when the lever is moved to either of the adjacent notches 44$^a$ and 44$^b$, the pinion 43 will be thrown into engagement with either rack member 14 or 15. On its upper side the sliding member 12 is provided a series of holes. One of these holes 45 (Fig. 5) is near the forward end of the member 12 and another 45$^a$ is near the rear end. The remaining two, 45$^b$, 45$^c$, as shown in Fig. 5, are equally spaced forwardly from the rear hole. On the top of the frame 13 there is secured a vertical cage 46 in which there is housed a spring pressed plunger 47 (Fig. 6) adapted to engage the holes in the member 12 when these are brought into registry with the plunger. The plunger 47 has an angular lug 48 projecting therefrom toward the lever 38, and this lever is provided with an arcuate cam 49 on which the lug 48 rides. With this construction it follows that when lever 38 is locked in the central notch 44 the plunger 47 will be free to move downwardly to engage one of the holes 45, 45$^a$, 45$^b$, 45$^c$, but when the lever 38 is moved to either of the other notches 44$^a$ or 44$^b$, the plunger will be raised by the cam 49 and the member 12 accordingly released. For the purpose of controlling the latch member 39 and swinging lever 38 there is preferably provided a forwardly extending rod 50 formed with a crank handle 51 at its forward end, which is preferably extended in position to be reached by the driver of a tractor pulling harrow. The rear end of rod 50 is bent at right angles and passed through an opening in the upper end of lever 38 where it is loosely held in any suitable manner, and this bent end 52 is loosely connected to the upper end of the control rod 53 for the latch 39 in the manner shown in Fig. 7. It will be evident that turning rod 50 by means of handle 51 will serve to raise the latch 39 and permit the lever 38 to be swung from one notch in the sector bar 40 to another by either a push or a pull on the rod 50.

In operation the shaft 26 is driven from one of the gangs through the sprocket 32, sprocket chain 31 and wheel 29, the flared bearing 30 and universal joint 27 permitting both angular and vertical movement of the gang on which the shaft is mounted, to the extent necessary in practical operation. The pinion 36 is thus driven constantly during travel of the harrow and with it the pinion 43. So long as lever 36 is in the center notch 44 the pinion 43 is in neutral position and no action of the angling mechanism on the gangs takes place. If the gangs are in straight position, as in Fig. 2, and it is desired to angle them, the latch 39 is raised by turning rod 50 and the lever 38 is then swung rearwardly to notch 44$^a$, bringing pinion 43 into mesh with the lower rack member 14, thereby causing the member 12 to be forced forwardly in the frame 13 and at the same time swinging the upper end of the equalizer lever 19 in the same direction, forcing its lower end and the inner ends of the forward gangs rearwardly, thus throwing them into working angle. At the same time the lever 22 will be swung in the opposite direction through the link 23 and links 25 connected to its lower end will pull forward on the inner ends of the rear gangs and swing them into angle also.

When pinion 43 has traveled to the end of either rack bar and runs off the rack teeth it will turn idly and the gangs will then be either at full angle or be in straightened position and at this point the lever 38 should be moved back to the central notch 44 when the plunger 47 will engage one of the end openings 45 or 45$^a$ and lock the member 12 in position. It will be evident that the gangs are straightened in the same manner as above described except that lever 38 is moved to notch 44$^b$ to bring pinion 43 into mesh with the upper rack bar 15. Should it be desired to give the gangs less than their full working angle, the lever 38 is swung back into the central notch 44 before the member 12 has reached its limit of movement and one of the intermediate holes 45$^b$ or 45$^c$ will then be engaged by plunger 47 and the member 12 and the gangs locked at the intermediate angle desired. Normally the drag of the soil on the front gangs is sufficient to cause the disk gangs to fall into angular position and the slidable member 12 to move forwardly in its frame providing the plunger 47 is not engaged in one of the openings in the sliding member, and should the lever 38 be moved to neutral position before an opening 45$^b$ or 45$^c$ is in registering position with plunger 47, the member 12 will continue to move forwardly until the opening comes under the plunger and is engaged thereby, thus locking the gangs at the intermediate angle selected.

It will be evident from the above description that there has been provided a simple type of power driven angling device for tractor harrows which is capable of easy control and which will not only throw the gangs into a full angle automatically, but in addition thereto provides means for giving the gangs a number of intermediate angles, less than the full angle, if desired.

We claim as our invention and desire to protect by Letters Patent:

1. The combination with a disk harrow comprising a frame and disk gangs pivoted thereto, of power actuated angling mechanism for the gangs comprising a pinion journaled on the frame, means for driving said pinion in a constant direction, a gang shifting member longitudinally slidable on the frame and carrying oppositely facing rack bars, connections between one end of the gangs and said member, and means for bringing the pinion into mesh with either rack bar to give said gang shifting member positive movement in opposite directions.

2. The combination with a disk harrow comprising a frame and disk gangs pivoted thereto, of angling mechanism for the gangs comprising a shiftable pinion journaled on the frame, means for constantly driving the pinion, a member slidable back and forth on the frame and provided with opposite pinion engaging surfaces, connections between one end of the gangs and said member, and means for shifting said pinion into and out of contact with either of the engaging surfaces of said member.

3. The combination with a disk harrow comprising a frame and disk gangs pivoted thereto, of traction actuated angling mechanism for the gangs comprising a member slidable back and forth on the frame and provided with opposed rack bars, a movable pinion journaled on the frame and driven by travel of the harrow, connections between said slidable member and one end of the gangs, and means for moving said pinion into mesh with either rack bar.

4. The combination with a disk harrow comprising a frame and disk gangs pivoted thereto, of angling mechanism for the gangs comprising a member slidable back and forth on the frame and formed with spaced, inwardly facing rack bars, a shiftable pinion positioned between said rack bars, means for constantly driving said pinion, connections between said slidable member and one end of the gangs, and means for shifting said pinion from one rack bar to the other.

5. The combination with a disk harrow comprising a frame and disk gangs pivoted thereto, of angling mechanism for the gangs comprising a member slidably mounted on the frame and formed with spaced, inwardly facing rack bars, connections between said slidable member and one end of the gangs, a lever pivoted adjacent said slidable member and formed with a crank arm positioned between the rack bar, a pinion journaled on said crank arm, means for driving said pinion, and means for locking said lever with the pinion in neutral position or with the pinion in mesh with either rack bar.

6. The combination with a disk harrow comprising a frame and disk gangs pivoted thereto, of angling mechanism for the gangs comprising a rotating element, means for driving said element, a member movable back and forth on the frame, connections between one end of the gangs and said member, means for connecting said rotating element and member to move said member in either direction on the frame and means for releasing said connection and simultaneously locking said member to the frame.

7. The combination with a disk harrow comprising a frame and disk gangs pivoted thereto, of angling mechanism for the gangs comprising a rotating element, means for driving said element, a member movable back and forth on the frame, connections between one end of the gangs and said member, means for connecting said rotating element and member to move said member in either direction on the frame, and means for releasing said connection and simultaneously locking said member to the frame at any of a plurality of points in its range of movement.

8. A gang angling device for disk harrows comprising a frame having a pair of opposite, inwardly facing, rack bars slidably mounted thereon, a drive pinion journaled on said frame between said rack bars, a second pinion in mesh therewith and journaled on a support movable about the axis of said drive pinion, and means for swinging said support to bring said second pinion into engagement with either rack bar.

In testimony whereof we affix our signatures.

WILLIAM C. DWYER.
JOSEPH I. MITCHELL.